(12) United States Patent
Cumpston et al.

(10) Patent No.: US 9,041,272 B2
(45) Date of Patent: May 26, 2015

(54) CONTROL OF LUMEN LOSS IN A LIQUID-FILLED LED BULB

(71) Applicant: Switch Bulb Company, Inc., San Jose, CA (US)

(72) Inventors: Brian Cumpston, Pleasanton, CA (US); David Horn, Saratoga, CA (US); Ronan Le Toquin, Fremont, CA (US)

(73) Assignee: Switch Bulb Company, Inc., San Jose, CA (US)

( * ) Notice: Subject to any disclaimer, the term of this patent is extended or adjusted under 35 U.S.C. 154(b) by 0 days.

(21) Appl. No.: 14/105,102

(22) Filed: Dec. 12, 2013

(65) Prior Publication Data

US 2014/0159561 A1 Jun. 12, 2014

Related U.S. Application Data

(60) Provisional application No. 61/736,489, filed on Dec. 12, 2012.

(51) Int. Cl.
| | |
|---|---|
| H01J 7/26 | (2006.01) |
| H01J 61/52 | (2006.01) |
| H01K 1/58 | (2006.01) |
| F21V 29/00 | (2006.01) |
| F21K 99/00 | (2010.01) |
| F21V 3/00 | (2006.01) |
| F21Y 101/02 | (2006.01) |
| F21Y 111/00 | (2006.01) |

(52) U.S. Cl.
CPC ............ *F21V 29/004* (2013.01); *F21V 29/248* (2013.01); *F21V 3/00* (2013.01); *F21K 9/135* (2013.01); *F21Y 2101/02* (2013.01); *F21Y 2111/001* (2013.01)

(58) Field of Classification Search
CPC ......... H01J 29/45; H01J 29/456; H01J 45/00; F21V 29/2231; F21V 29/2293; F21V 7/22; F21V 29/004; F21V 29/2206; F21V 29/24; F21V 29/246; F21V 29/248; F21V 3/00; F21Y 2101/02; F21Y 2111/007; F21Y 2111/001; F21S 48/215; F21S 48/328; F21K 9/13; F21K 9/135; H01L 51/529; H05B 33/14; H05B 33/20; H05B 33/12; H05B 33/145; H05B 33/28; B60Q 1/2665; B60Q 1/2669

See application file for complete search history.

(56) References Cited

U.S. PATENT DOCUMENTS

| | | | |
|---|---|---|---|
| 1,616,202 A | 2/1927 | Shook | |
| 8,277,094 B2 * | 10/2012 | Wheelock et al. | ............ 362/373 |
| 2012/0002401 A1 | 1/2012 | Clifford | |

OTHER PUBLICATIONS

Characteristic Properties of Silicone Rubber compounds Shin-Etsu, Jul. 7, 2008, pp. 1-16.*
International Search Report and Written Opinion received for PCT Patent Application No. PCT/US2013/74803, mailed on Apr. 21, 2014, 10 pages.
"Characteristic Properties of Silicone Rubber Compounds", Shin-Etsu, 2008, 18 pages.
"LED Luminaire Lumen Maintenance Ratings", GE Lighting Solutions, 2011, 9 pages.

* cited by examiner

*Primary Examiner* — Donald Raleigh
(74) *Attorney, Agent, or Firm* — Morrison & Foerster LLP (57) ABSTRACT

A liquid-filled light emitting diode (LED) bulb including a base, a shell connected to the base forming an enclosed volume, a thermally conductive liquid held within the enclosed volume, a support structure connected to the base, and several LEDs attached to the support structure. The thermally conductive liquid has an oxygen content of at least 5 cubic centimeters of oxygen per liter of the thermally conductive fluid.

16 Claims, 7 Drawing Sheets

CONTROL OF LUMEN LOSS IN A LIQUID-FILLED LED BULB

CROSS-REFERENCE TO RELATED APPLICATIONS

This application claims priority to U.S. Provisional Application Ser. No. 61/736,489, filed Dec. 12, 2012, the entire disclosure of which is hereby incorporated by reference in its entirety for all purposes as if put forth in full below.

BACKGROUND

1. Field

The present disclosure relates generally to light-emitting diode (LED) bulbs, and more specifically to controlling lumen loss over time in a liquid-filled LED bulb.

2. Description of Related Art

Traditionally, lighting has been generated using fluorescent and incandescent light bulbs. While both types of light bulbs have been reliably used, each suffers from certain drawbacks. For instance, incandescent bulbs tend to be inefficient, using only 2-3% of their power to produce light, while the remaining 97-98% of their power is lost as heat. Fluorescent bulbs, while more efficient than incandescent bulbs, do not produce the same warm light as that generated by incandescent bulbs. Additionally, there are health and environmental concerns regarding the mercury contained in fluorescent bulbs.

Thus, an alternative light source is desired. One such alternative is a bulb utilizing an LED. An LED comprises a semiconductor junction that emits light due to an electrical current flowing through the junction. Compared to a traditional incandescent bulb, an LED bulb is capable of producing more light using the same amount of power. Additionally, the operational life of an LED bulb is orders of magnitude longer than that of an incandescent bulb, for example, 10,000-100,000 hours as opposed to 1,000-2,000 hours.

While there are many advantages to using an LED bulb rather than an incandescent or fluorescent bulb, LEDs have a number of drawbacks that have prevented them from being as widely adopted as incandescent and fluorescent replacements. One drawback is that an LED, being a semiconductor, generally cannot be allowed to get hotter than approximately 120° C. As an example, A-type LED bulbs have been limited to very low power (i.e., less than approximately 8 W), producing insufficient illumination for incandescent or fluorescent replacements.

One approach to alleviating the heat problem of LED bulbs is to use a thermally conductive liquid to cool the LEDS. To facilitate thermal dissipation, it may be advantageous to increase the thermal paths from the LED to the environment.

LEDs may also be susceptible to a loss of light output (i.e., lumen loss) over time. That is, the quantity of light generated by the LEDs may decrease with use, as compared to an initial quantity of light generated by the LEDs. One potential source of lumen loss is the deposition or reaction of contaminants on the lens or casing of the LED. The heat generated during use of the LED bulb may further drive the deposition or reaction of contaminants. The deposition or reaction of contaminates on the LED casing may cause undesirable alteration or even blocking of the light emitted by the LEDs in the LED bulb. Potential contamination sources in an LED bulb include organics found in solder flux or on printed circuitry. In LED bulbs employing a conductive liquid for thermal cooling of the LEDs, the lumen loss problem may be exacerbated, as the circulating conductive liquid may expose the lens or covering of the LEDs to contaminates suspended or dissolved in the liquid.

DESCRIPTION OF THE FIGURES

FIGS. 6A and B depict an LED bulb base having a passage for airflow.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various embodiments are described below relating to LED bulbs. As used herein, an "LED bulb" refers to any light-generating device (e.g., a lamp) in which at least one LED is used to generate light. Thus, as used herein, an "LED bulb" does not include a light-generating device in which a filament is used to generate the light, such as a conventional incandescent light bulb. It should be recognized that the LED bulb may have various shapes in addition to the bulb-like A-type shape of a conventional incandescent light bulb. For example, the bulb may have a tubular shape, a globe shape, or the like. The LED bulb of the present disclosure may further include any type of connector; for example, a screw-in base, a dual-prong connector, a standard two- or three-prong wall outlet plug, bayonet base, Edison Screw base, single-pin base, multiple-pin base, recessed base, flanged base, grooved base, side base, or the like.

Figure 1:
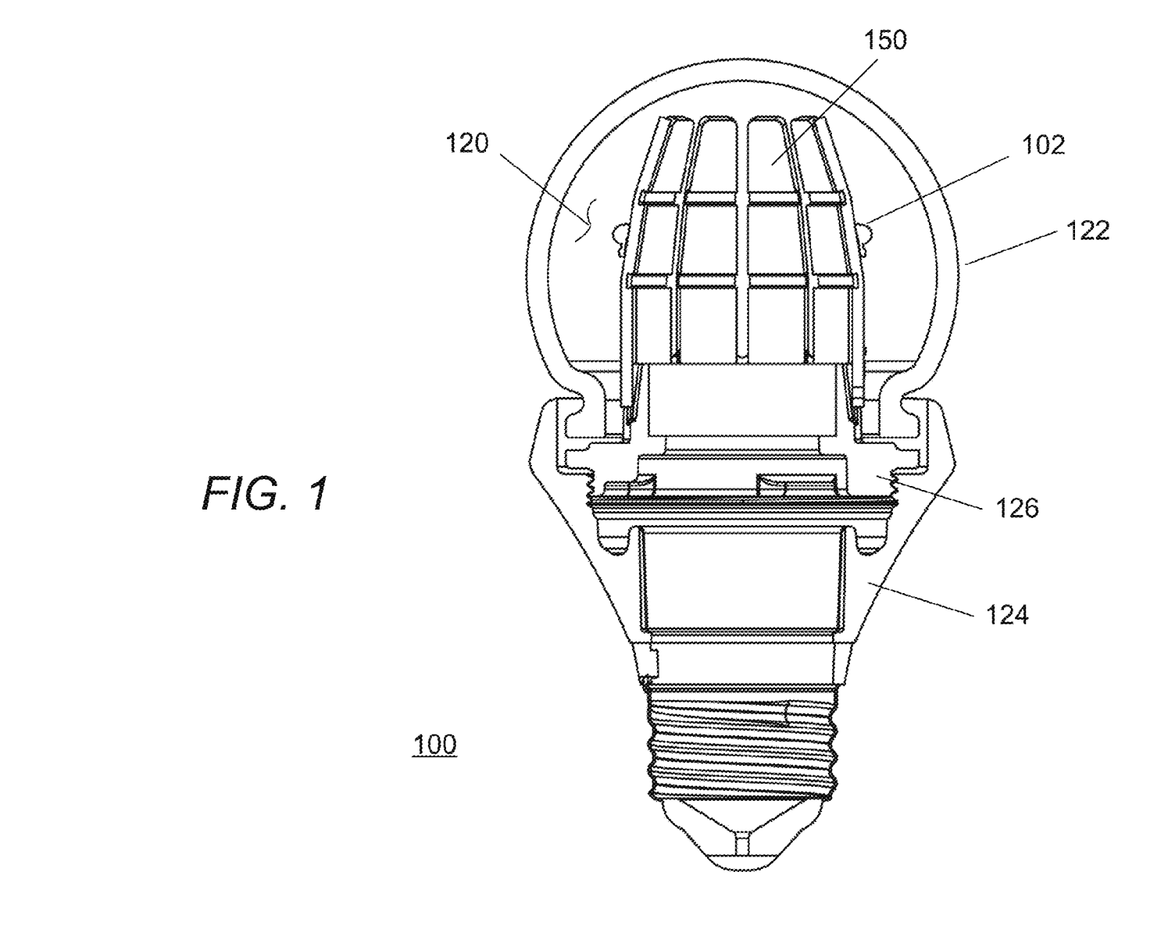
FIG. 1 depicts a cross-sectional view of a liquid-filled LED bulb.

FIG. 1 depicts a cross-sectional view of an exemplary LED bulb 100. For convenience, all examples provided in the present disclosure describe and show LED bulb 100 being a standard A-type form factor bulb. However, as mentioned above, it should be appreciated that the present disclosure may be applied to LED bulbs having any shape, such as a tubular bulb, a globe-shaped bulb, or the like.

In some embodiments, LED bulb 100 may use 6 W or more of electrical power to produce light equivalent to a 40 W incandescent bulb. In some embodiments, LED bulb 100 may use 20 W or more to produce light equivalent to or greater than a 75 W incandescent bulb. Depending on the efficiency of the LED bulb 100, between 4 W and 16 W of heat energy may be produced when the LED bulb 100 is illuminated.

LED bulb 100 includes a shell 122 and base 124, which interact to form an enclosed volume 120 over one or more LEDs 102. As shown in FIG. 1, the base 124 includes an adaptor for connecting the bulb to a lighting fixture. In some cases, the shell 122 and base 124 have a form factor similar to an A-type shape of a conventional incandescent light bulb.

Shell 122 may be made from any transparent or translucent material such as plastic, glass, polycarbonate, or the like. Shell 122 may include dispersion material spread throughout the shell to disperse light generated by LEDs 102. The dispersion material prevents LED bulb 100 from appearing to have one or more point sources of light.

A thermally conductive liquid fills the volume 120. As used herein, the term "liquid" refers to a substance capable of flowing. Also, the substance used as the thermally conductive liquid is a liquid or at the liquid state within, at least, the operating, ambient-temperature range of the bulb. An exemplary temperature range includes temperatures between −40° C. to +40° C. The thermally conductive liquid may be mineral oil, silicone oil, glycols (PAGs), fluorocarbons, or other material capable of flowing. In the examples discussed below, 20 cSt viscosity polydimethylsiloxane (PDMS) liquid sold by Clearco is used as a thermally conductive liquid. It may be desirable to have the liquid chosen be a non-corrosive dielectric. Selecting such a liquid can reduce the likelihood that the liquid will cause electrical shorts and reduce damage done to the components of LED bulb 100.

The thermally conductive liquid is able to transfer heat away from the LEDs 102 and components in thermal connection with the LEDs 102. Typically, the thermally conductive liquid transfers the heat via conduction and convection to other, cooler components of the LED bulb 100, including the shell 122 and base 124. During typical operation, the temperature of the LEDs 102 is higher than that of the shell 122 and base 124. In some cases, the temperature difference between the LEDs 102 and the shell 122 results in passive convective flow of the thermally conductive liquid. The temperature difference between the LEDs 102 and the base 124 may also contribute to the induction of passive convective flow of the thermally conductive liquid. In general, the more heat that can be dissipated into the thermally conductive liquid, the greater the temperature difference between the components resulting in more passive convective flow.

Volume 120 of LED bulb 100 is substantially hermetically sealed-in and therefore substantially impermeable to gases from the ambient operating environment.

In one embodiment, volume 120 is filed with a substantially de-gassed (i.e., gas-free) thermally conductive liquid, to facilitate filling and to minimize the amount of trapped gas in volume 120. In another embodiment, volume 120 is filed with a thermally conductive liquid that is partially or completed saturated with one or more gases, such as oxygen, or a mixture of gases.

LED bulb 100 also includes a support structure 150 for mounting the plurality of LEDs 102. As shown in FIG. 1, the support structure 150 forms a cylindrical or conical shape and the plurality of LEDs 102 are mounted in a radial pattern within the shell 122. The support structure 150 is attached to the base 124 via a hub 126/128.

Figure 2:
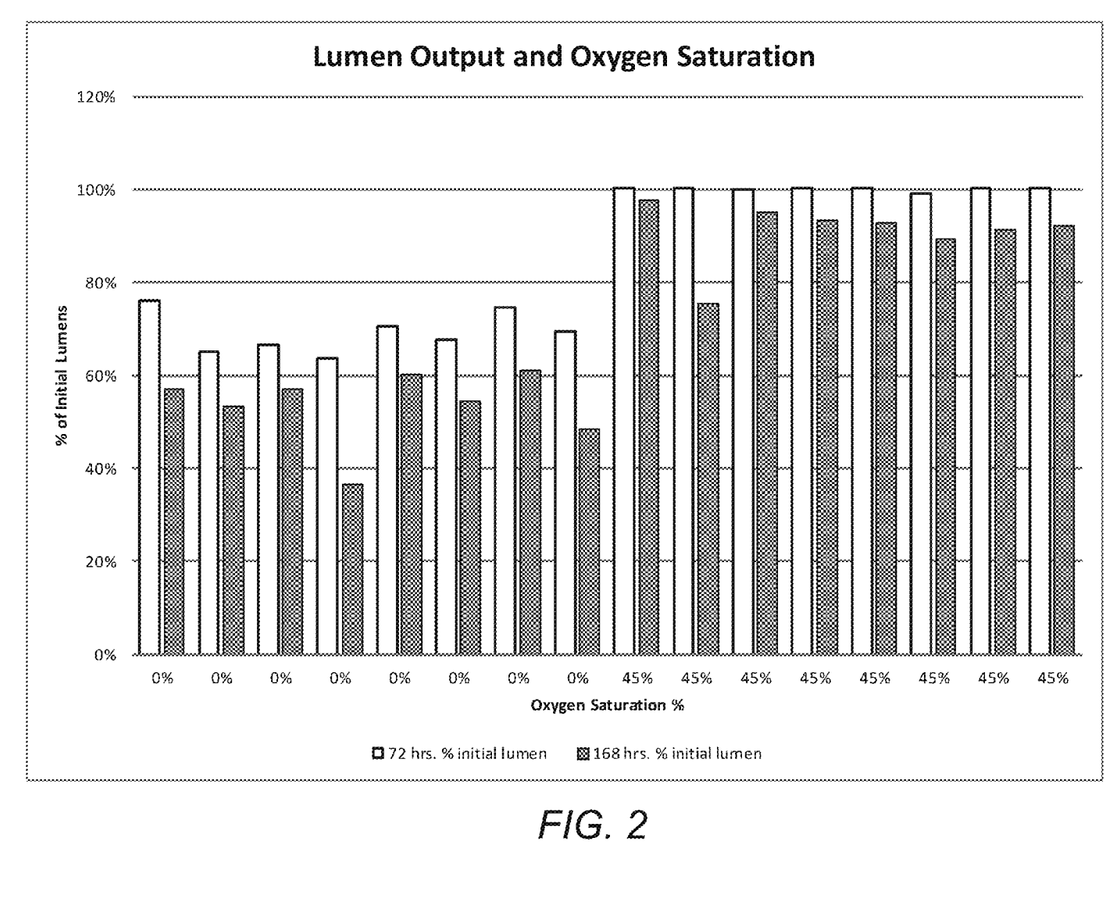
FIG. 2 is a graph depicting the percentage of cold lumens compared against cold lumens emitted at first time startup for two sets of 75 W equivalent LED bulbs after varying periods of cumulative operation.

As discussed above, LEDs 102 of LED bulb 100 may experience lumen loss with continued operation. FIG. 2 is a graph depicting the percentage of cold lumens compared against cold lumens emitted at first time startup for two sets of 75 W equivalent LED bulbs 100 after varying periods of cumulative operation. As used herein, "cold lumens", "cold lumen emission", or "cold lumen output" refers to amount of light emitted by an LED bulb at startup after a period of non-operation. Typically, the level of lumen loss (or maintenance) after a period of operation is expressed as a percentage of cold lumen emission for an LED bulb compared to the cold lumen emission for the same bulb, as measured at the time of initial or first time operation of the given LED bulb.

Each LED bulb 100 of set A includes substantially gas-free thermally conductive silicone oil in volume 120. Each LED bulb 100 of set B includes a thermally conductive silicon oil in volume 120 that is a mixture of 30 parts gas-free thermally conductive silicone oil and 25 parts oxygen-saturated thermally conductive silicone oil (approximately 45% oxygen saturated). Under normal conditions, the 45% oxygen saturated silicone oil contains approximately 19 $cm^3/L$ of $O_2$. Each bulb was operated in a 45° C. ambient room temperature testing environment, with an initial cold lumen measurement taken at time zero. Each bulb was then operated continuously for 72 hours and then switched off and allowed to cool to ambient temperature before making a cold lumen measurement. Each bulb was then operated continuously for an additional 96 hours and then again measured for cold lumen output. As shown in FIG. 2, Set A bulbs (0% oxygen saturation) exhibit approximately 64% to 76% (mean of 69%) of initial cold lumen output after 72 hours of operation and 36% to 61% (mean of 53%) of initial cold lumen output after 168 hours of operation. Set B bulbs (45% oxygen saturation) exhibit approximately 99% to 100% (mean of 100%) of initial cold lumen output after 72 hours of operation and 75% to 98% (mean of 91%) of initial cold lumen output after 168 hours of operation.

As shown in FIG. 2, lumen loss over time in the tested liquid-filled LED bulbs is a function of oxygen content in the liquid. Without being limited by theory, it is believed that oxygen gas dissolved in the thermally conductive liquid prevents or limits the deposition of organic contaminants on the lens or covering of LEDs in a LED bulb. Described herein are liquid-filled LED bulbs having reduced lumen loss over time and methods and systems for controlling lumen loss in liquid-filled LED bulbs.

In some embodiments, a liquid-filled LED bulb as described herein includes a thermally conductive liquid containing at least 5 $cm^3/L$ of $O_2$, 10 $cm^3/L$ of $O_2$, 15 $cm^3/L$ of $O_2$, 20 $cm^3/L$ of $O_2$, or 25 $cm^3/L$ of $O_2$.

In some embodiments, a liquid-filled LED bulb as described herein may maintain greater than 80%, greater than 85%, greater than 90%, or greater than 95% of its initial cold lumens of emission after each of 48 hours, 72 hours, 96 hours, 144 hours, 168 hours, 240 hours, 266 hours 336 hours, or 432 hours of cumulative operation.

1. LED Bulb Having an Oxygen-Permeable Diaphragm

Normal ambient atmosphere is composed of approximately 21% oxygen. A liquid-filled LED may be made oxygen-permeable so as to allow atmospheric oxygen to diffuse into the thermally conductive liquid, thereby controlling lumen loss.

Figure 3:
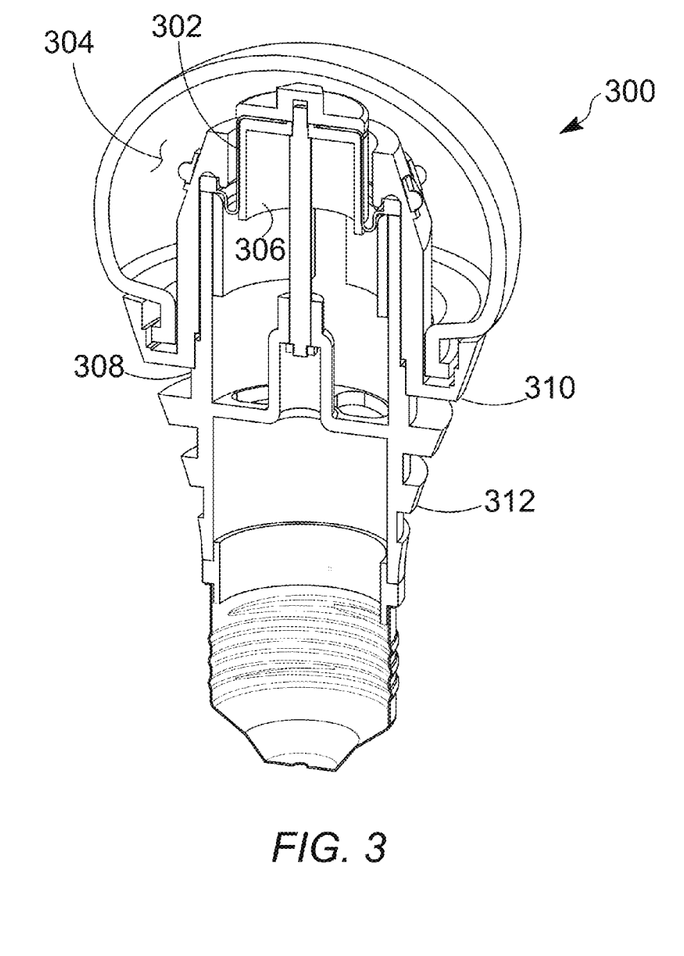
FIG. 3 illustrates a liquid-filled LED bulb having a diaphragm element that operates as a liquid-volume compensator mechanism.

FIG. 3 illustrates a liquid-filled LED bulb 300 having a diaphragm element 302 that operates as a liquid-volume compensator mechanism, substantially as described in U.S. Pat. No. 8,152,341, which is hereby incorporated by reference in its entirety and particular with respect to the LED bulb embodiment depicted as FIG. 2A thereof. LED bulb 300 is filled with a thermally conductive liquid in volume 304. Thermally conductive liquid 304 may be a de-gassed liquid, a partially oxygen-saturated liquid, or an oxygen-saturated liquid.

As LEDs 306 produce heat, the thermally conductive liquid 304 expands, increasing the pressure inside the enclosed volume defined between shell 308 and bulb base 310. As shown in FIG. 3, at least a portion of one surface of diaphragm element 302 is in fluidic connection to the thermally conductive liquid 304 such that the liquid pressure exerts a force on at least part of diaphragm element 302. Diaphragm element 302 is able to deflect from a first position to a second position, in response to the increase in liquid pressure, thereby compensating for expansion of thermally conductive liquid 304.

Diaphragm element 302 may be constructed from a material selected for oxygen-permeability, such as natural rubber or silicone rubber, to allow for ambient oxygen to permeate into thermally conductive liquid 304. In one embodiment, diaphragm element 302 has an oxygen transmission rate of $1 \times 10^{-6}$ cm$^3$/cm$^2$/min. or greater, preferably $1 \times 10^{-5}$ cm$^3$/cm$^2$/min. or greater, and more preferably $1 \times 10^{-4}$ cm$^3$/cm$^2$/min. or greater, each determined at 20° C. In alternative embodiments, one or more other portions of bulb 300 that are in contact with thermally conductive liquid 304 and in gaseous contact with the ambient atmosphere are made from an oxygen-permeable material, in conjunction with, or as an alternative to, an oxygen-permeable diaphragm.

Figure 4:
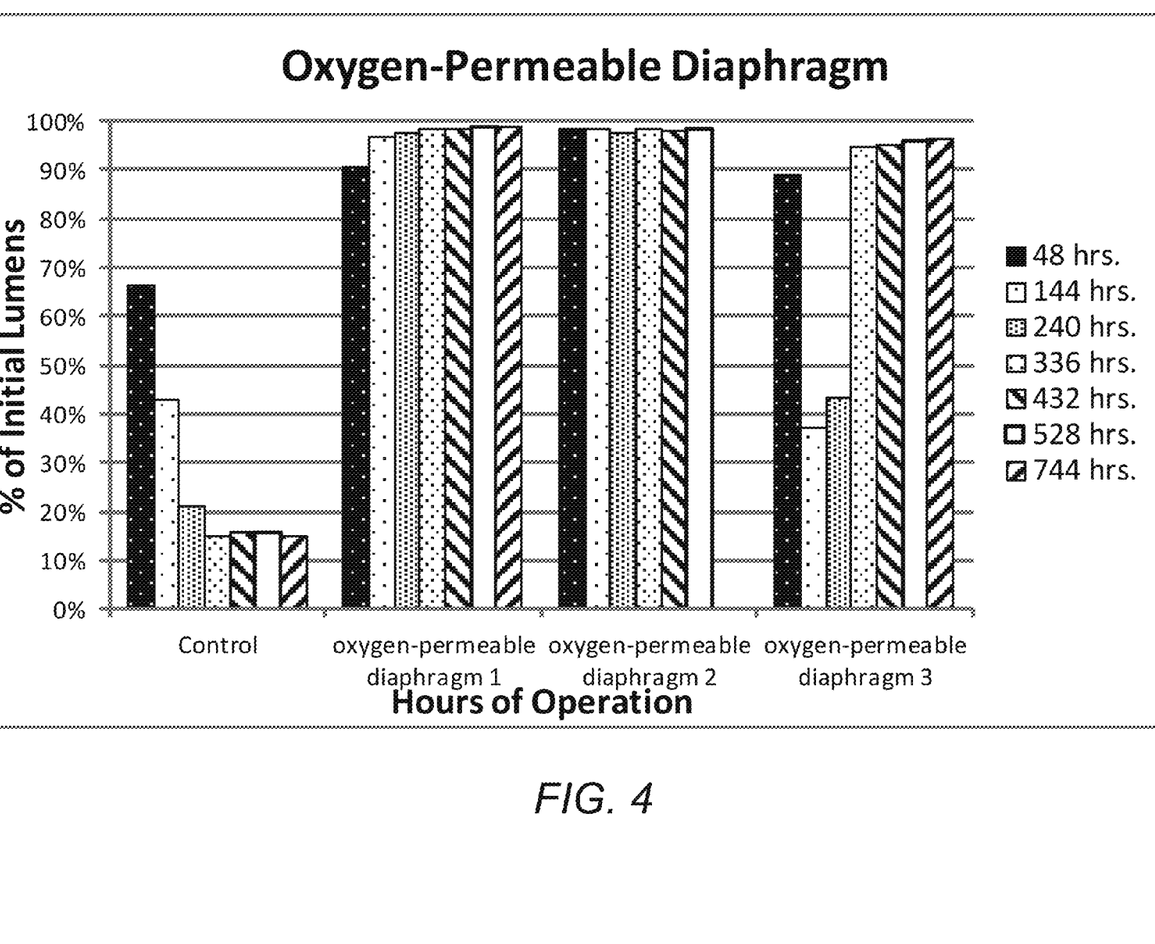
FIG. 4 is a graph depicting the percentage of initial cold lumens produced after cumulative periods of use for liquid-filled LED bulbs having an oxygen-permeable diaphragm and a control bulb without an oxygen-permeable diaphragm.

FIG. 4 is a graph depicting the percentage of initial cold lumens measured over periods of continuous use for several similarly constructed 75 W equivalent LED bulbs 300 (bulbs B, C, and D). Each of bulbs B, C, and D is filled with de-gassed thermally conductive silicone oil and includes an oxygen-permeable diaphragm 302. FIG. 4 also depicts initial cold lumen data over periods of cumulative use for a control bulb (bulb A), which does not have an oxygen-permeable diaphragm 302 and has a liquid volume that is substantially hermitically sealed-in. The control bulb is also filled with de-gassed thermally conductive silicone oil. For each bulb, cold lumen measurements were taken at time zero, 48 hours, 144 hours, and 240 hours, 336 hours, 432 hours, 528 hours, and 744 hours of cumulative operation. As seen in FIG. 4, control bulb A exhibited a significant degree of lumen loss over time, whereas bulbs B, C, and D, each having an oxygen-permeable diaphragm, maintained significantly higher percentages of initial cold lumens despite long-term, continuous operation.

Depending on the construction and assembly of an LED bulb having an oxygen permeable diaphragm, it may be beneficial to ensure that the non-liquid interface of the oxygen-permeable diaphragm has gas access to ambient air. With reference again to FIG. 3, non-liquid interface 306 of oxygen-permeable diaphragm 302 accesses ambient air primarily at junction 308, where support 310 mates with base 312. Junction 308 may be formed, for example, as a threaded interface. In one embodiment, a threadlocking adhesive, such as Loctite® is used to insure a tight and permanent seal, which may be desirable in a consumer product to prevent disassembly and/or tampering. A threadlocking adhesive may, however, effectively form a hermetic seal, thereby preventing ambient atmosphere from contacting the oxygen-permeable diaphragm and atmospheric oxygen from diffusing into the thermally conductive liquid to control lumen loss.

Figure 5:
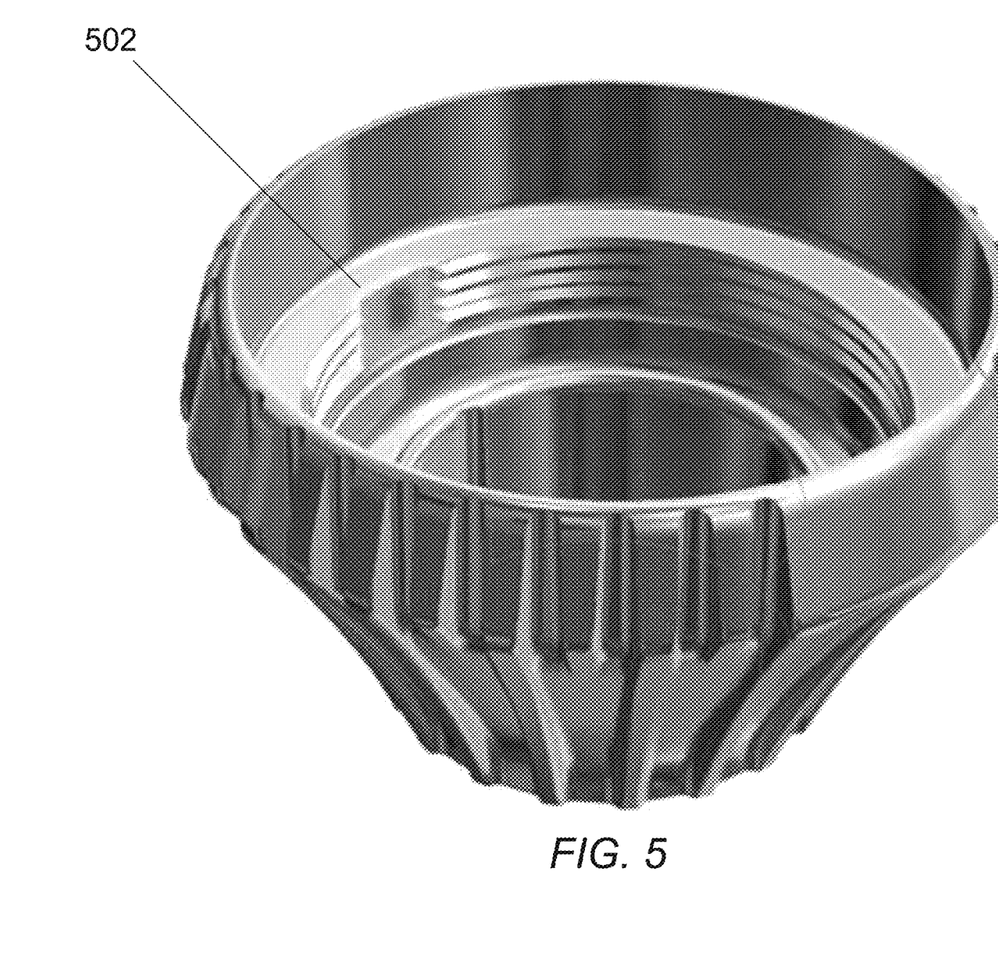
FIG. 5 depicts a threaded interface for an LED bulb base having a discontinuity introduced into the threaded interface.
Figure 6:
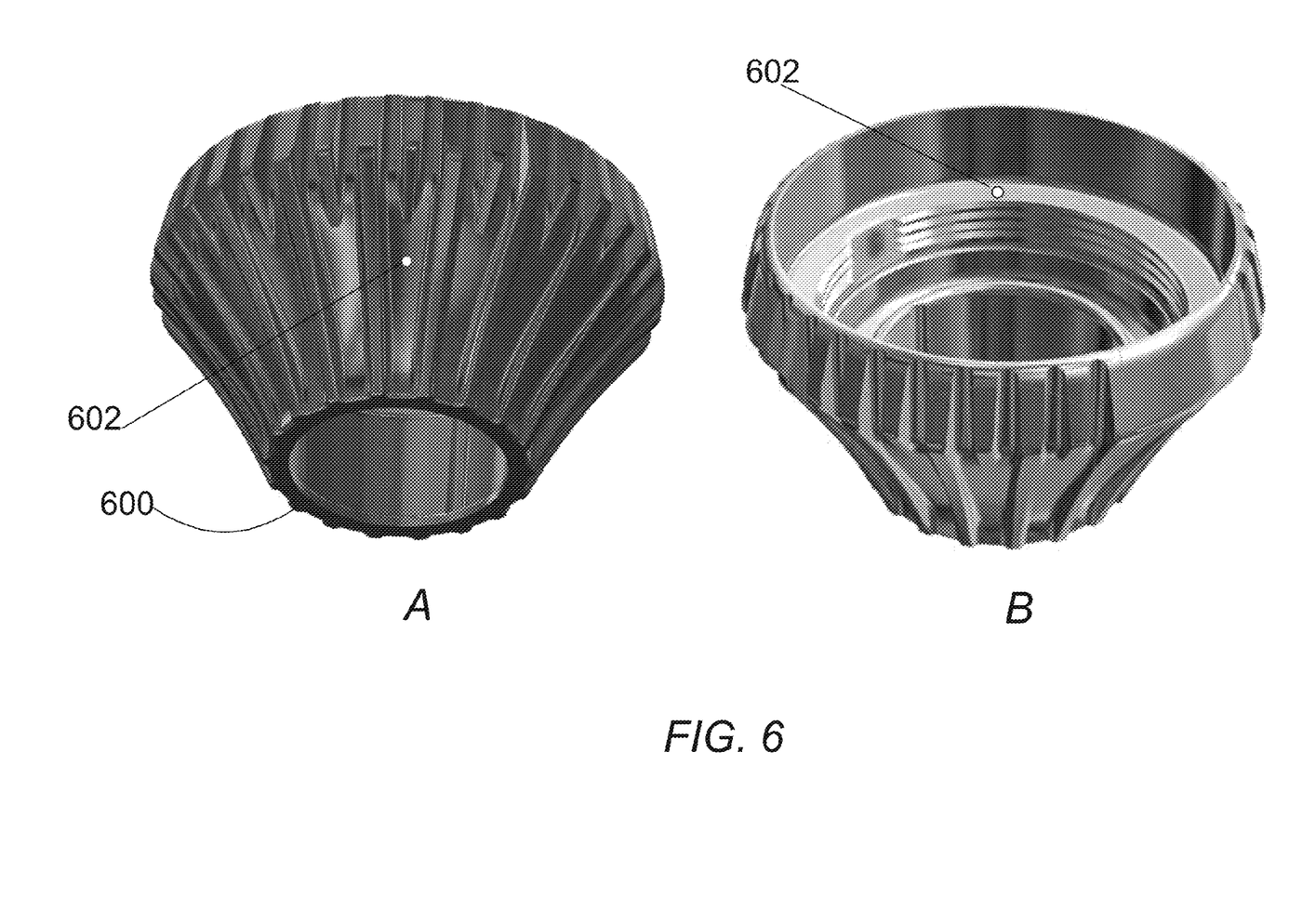

One or more approaches may be taken to ensure that the oxygen-permeable diaphragm has access to ambient atmosphere, even if a threadlocking adhesive is used. In one embodiment, a discontinuity 502 is introduced into the threaded interface, as depicted in FIG. 5. The discontinuity allows for passage of ambient atmosphere across junction 308 and prevents formation of a hermetic seal. In another embodiment, passage(s) 602 is formed in base 600, as shown in FIGS. 6A and B (passage 602 intentional shown out-of-scale). Passage 602 traverses base 600 above and below the threaded junction and may be sized to provide a desired level of airflow. In some embodiments, passage 602 is 200 μm, 250 μm, 300 μm 350 μm, 400 μm, 450 μm, or 500 μm in size. Passage 602 allows ambient air to bypass junction 308.

2. High-Temperature Conditioning of an LED Bulb Having an Oxygen-Permeable Diaphragm Since gas permeation is a function of time and temperature, it may be desirable to subject LED bulb 300 to a period of high temperature exposure or "conditioning" treatment to increase the rate of oxygen permeation and thereby more rapidly increase the level of oxygen saturation in thermally conductive liquid 304, prior to sustained operation of LED bulb 300. A conditioning treatment may be especially preferred when LED bulb 300 is initially filled with a de-gassed thermally conductive liquid 304. Preferably, the conditioning treatment is carried out prior to sustained use of a liquid-filled LED bulb.

In general, a conditioning treatment is carried out by exposing bulb 300 to an oxygen-containing atmosphere at an elevated temperature. In one embodiment, ambient atmosphere at a temperature of 120° C. for one hour. In alternative embodiments, bulb 300 is conditioned in an oxygen-enriched atmosphere having an oxygen content of 25%, 30%, 35%, 40%, 45%, or 50%. Conditioning may be carried out, in alternative embodiments, at temperatures of 70° C., 80° C., 90° C., 100° C., 110° C., 130° C., or 140° C. Conditioning time may be adjusted based on factors such as the temperature selected, the oxygen permeability to the thermally conductive liquid 304, and the desired level of oxygen saturation. In some embodiments, bulb 300 is conditioned for a period of 30 minutes, 45 minutes, 1 hour, 1.5 hours, 2 hours, 2.5 hours, or 3 hours.

Figure 7:
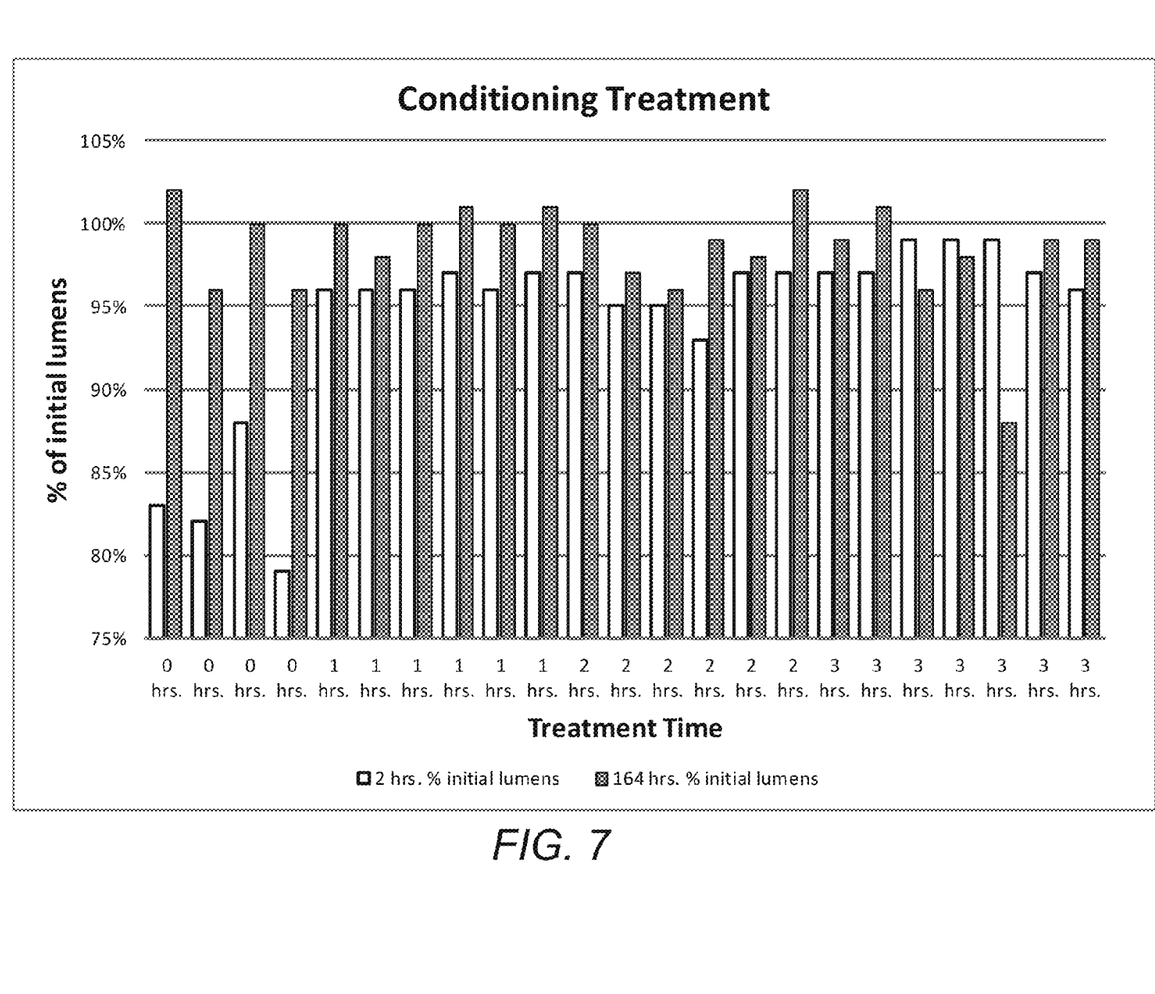
FIG. 7 is a graph depicting the percentage of initial cold lumens measured over periods of continuous use for several similarly-constructed 75 W equivalent LED bulbs that were subjected to varying periods of conditioning treatment at 120° C.

FIG. 7 is a graph depicting the percentage of initial cold lumens measured over periods of continuous use for several similarly-constructed 75 W equivalent LED bulbs 300 that were subjected to varying periods of conditioning treatment at 120° C.: zero hours (control), 1 hour, 2 hours, and four hours of treatment. As seen in FIG. 5, the control bulb (zero hours of conditioning) demonstrated a marked decrease in light output, as compared to initial lumen output, after two hours of continuous use. After 164 hours of continuous use, the control bulbs had substantially recovered light output, presumably due to diffusion of oxygen via the oxygen-permeable diaphragm. With the exception of one outlier, bulbs that underwent conditioning treatment demonstrated significantly less light output loss at two hours of sustained use. While the control significantly recovered from the initial lumen loss, it is generally desirable to have a LED bulb that maintains consistent light output during its operational lifetime.

What is claimed is:
1. A light emitting diode (LED) bulb comprising:
   a base;
   a shell connected to the base forming an enclosed volume;
   a thermally conductive liquid held within the enclosed volume;
   a support structure connected to the base;
   a plurality of LEDs attached to the support structure;
   wherein the thermally conductive liquid has an oxygen content of at least 15 cubic centimeters of oxygen per liter of the thermally conductive fluid.

2. The LED bulb of claim 1, wherein the thermally conductive liquid is in gaseous contact with the ambient atmosphere.

3. The LED bulb of claim 2, further comprising an oxygen-permeable diaphragm in contact with the thermally conductive liquid and wherein the thermally conductive liquid is in gaseous contact with the ambient atmosphere by way of the oxygen-permeable diaphragm.

4. The LED bulb of claim 1, wherein the shell is connected to the base by an oxygen-permeable junction.

5. The LED bulb of claim 4, wherein the junction is an adhesively-bonded, threaded junction.

6. The LED bulb of claim 5, wherein the junction comprises a discontinuity or passage configured to allow the thermally conductive liquid to be in gaseous contact with the ambient atmosphere.

7. The LED bulb of claim 1, wherein the thermally conductive liquid has an oxygen content of at least 20 cubic centimeters of oxygen per liter of the thermally conductive fluid.

8. The LED bulb of claim 1, wherein the thermally conductive liquid has an oxygen content of at least 25 cubic centimeters of oxygen per liter of the thermally conductive fluid.

9. The LED bulb of claim 1,
wherein the LED bulb has undergone at least 48 hours of cumulative operation and wherein the operated LED bulb maintains a level of cold lumen emission equal to at least 80% of the cold lumen emission for the LED bulb at initial operation.

10. The LED bulb of claim 1, further comprising:
an oxygen-permeable diaphragm in contact with the thermally conductive liquid.

11. A LED bulb of claim 10, wherein the oxygen-permeable diaphragm has an oxygen transmission rate of $1 \times 10^{-6}$ cm$^3$/cm$^2$/min. or greater.

12. A LED bulb of claim 10, wherein the oxygen-permeable diaphragm has an oxygen transmission rate of $1 \times 10^{-5}$ cm$^3$/cm$^2$/min. or greater.

13. A LED bulb of claim 10, wherein the oxygen-permeable diaphragm has an oxygen transmission rate of $1 \times 10^{-4}$ cm$^3$/cm$^2$/min. or greater.

14. A method for treating a light emitting diode (LED) bulb to control lumen loss, the method comprising:
exposing the LED bulb to an oxygen-containing atmosphere at a temperature of 70° C or greater for a period of 30 minutes or greater,
wherein the LED bulb comprises:
a base;
a shell connected to the base forming an enclosed volume;
a thermally conductive liquid held within the enclosed volume, the thermally conductive liquid in gaseous contact with the ambient atmosphere;
a support structure connected to the base;
a plurality of LEDs attached to the support structure, and
wherein the thermally conductive liquid has an oxygen content of at least 15 cubic centimeters of oxygen per liter of the thermally conductive fluid after the exposure step.

15. The method of claim 14, wherein the thermally conductive liquid has an oxygen content of at least 20 cubic centimeters of oxygen per liter of the thermally conductive fluid.

16. The method of claim 14, wherein the thermally conductive liquid has an oxygen content of at least 25 cubic centimeters of oxygen per liter of the thermally conductive fluid.

* * * * *